United States Patent
Omori et al.

(10) Patent No.: US 7,967,533 B2
(45) Date of Patent: Jun. 28, 2011

(54) SURFACE-COATED CUTTING TOOL

(75) Inventors: Naoya Omori, Itami (JP); Yoshio Okada, Itami (JP); Minoru Itoh, Itami (JP); Shinya Imamura, Itami (JP); Susumu Okuno, Itami (JP); Hiroyuki Morimoto, Itami (JP); Chikako Kojima, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 486 days.

(21) Appl. No.: 12/094,236

(22) PCT Filed: Aug. 8, 2007

(86) PCT No.: PCT/JP2007/065527
§ 371 (c)(1),
(2), (4) Date: May 19, 2008

(87) PCT Pub. No.: WO2008/026433
PCT Pub. Date: Mar. 6, 2008

(65) Prior Publication Data
US 2009/0097933 A1    Apr. 16, 2009

(30) Foreign Application Priority Data

Aug. 31, 2006  (JP) ................................. 2006-236448

(51) Int. Cl.
*B23B 27/14* (2006.01)
*B23B 51/00* (2006.01)
(52) U.S. Cl. ........................................ 407/119; 407/113
(58) Field of Classification Search .................. 407/113, 407/114, 115, 116, 119; 428/335, 336, 216; 51/309, 307
See application file for complete search history.

(56) References Cited

U.S. PATENT DOCUMENTS

| | | | | |
|---|---|---|---|---|
| 3,428,239 A | * | 2/1969 | Wannamaker et al. | 229/5.6 |
| 4,966,501 A | * | 10/1990 | Nomura et al. | 407/119 |
| 5,861,210 A | * | 1/1999 | Lenander et al. | 428/336 |
| 6,251,508 B1 | * | 6/2001 | Ruppi | 428/216 |
| 6,858,333 B2 | * | 2/2005 | Henderer | 428/698 |
| 7,090,914 B2 | * | 8/2006 | Yamagata et al. | 428/216 |
| 7,153,562 B2 | * | 12/2006 | Rodmar et al. | 428/216 |
| 7,396,371 B2 | * | 7/2008 | Cedergren et al. | 51/307 |
| 7,695,222 B2 | * | 4/2010 | Omori et al. | 407/119 |
| 7,727,592 B2 | * | 6/2010 | Cedergren et al. | 427/299 |
| 7,785,665 B2 | * | 8/2010 | Gates et al. | 427/255.19 |

FOREIGN PATENT DOCUMENTS

| | | |
|---|---|---|
| JP | 2004-50385 A | 2/2004 |
| JP | 2004-195595 A | 7/2004 |
| JP | 2004-216488 A | 8/2004 |
| WO | PCT/JP2007/065527 | 10/2007 |

* cited by examiner

*Primary Examiner* — Will Fridie, Jr.
(74) *Attorney, Agent, or Firm* — Ditthavong Mori & Steiner, P.C.

(57) ABSTRACT

A surface-coated cutting tool includes a coating layer (108) formed on a substrate (104), wherein assuming that the average thickness of the coating layer (108) on a first surface (106) and a second surface (107) of the substrate (104) is A, a difference between the maximum and minimum thicknesses of the coating layer (108) is 0.04×A or less. Also, a surface-coated cutting tool includes a coating layer (108) formed on a substrate (104), wherein assuming that the average thickness of the coating layer (108) on a first surface (106) of the substrate (104) is B1, and the average thickness of the coating layer (108) on a second surface (107) of the substrate (104) is B2, a value obtained by dividing an absolute difference value between B1 and B2 by a larger value of B1 and B2 is 0.04 or less.

18 Claims, 4 Drawing Sheets

SURFACE-COATED CUTTING TOOL

TECHNICAL FIELD

The present invention relates to a surface-coated cutting tool and particularly to a surface-coated cutting tool having a more stabilized tool life.

BACKGROUND ART

As cutting tools for cutting metals, many surface-coated cutting tools each including a substrate of cemented carbide, cermet, or ceramic, and one compound layer or a plurality of compound layers deposited on a surface of the substrate and composed of titanium carbide, titanium nitride, alumina, or titanium carbonitride have been used (refer to, for example, Patent Document 1 (Japanese Unexamined Patent Application Publication No. 2004-195595)).

[Patent Document 1] Japanese Unexamined Patent Application Publication No. 2004-195595

DISCLOSURE OF INVENTION

Problems to be Solved by the Invention

When a coating layer of a surface-coated cutting tool has a large thickness in a cutting edge portion, the wear resistance of the surface-coated cutting tool is generally increased, but defect resistance is decreased. While when a coating layer of a surface-coated cutting tool has a small thickness in a cutting edge portion, the defect resistance of the surface-coated cutting tool is increased, but the wear resistance is decreased.

However, in a conventional surface-coated cutting tool, the life time of the surface-coated cutting tool is unstable because of the sudden occurrence of defects in the surface-coated cutting tool and variations in wear progress. Therefore, stabilization of a tool life has been desired.

In consideration of the above-mentioned situation, an object of the present invention is to provide a surface-coated cutting tool having a more stabilized tool life.

Means for Solving the Invention

In accordance with a first embodiment of the present invention, the present invention can provide a surface-coated cutting tool including a coating layer formed on a substrate, wherein assuming that the average thickness of the coating layer on a first surface and a second surface of the substrate is A, a difference between the maximum and minimum thicknesses of the coating layer is larger 0.04×A or less.

In accordance with a second embodiment of the present invention, the present invention can provide a surface-coated cutting tool including a coating layer formed on a substrate, wherein assuming that the average thickness of the coating layer on a first surface of the substrate is B1, and the average thickness of the coating layer on a second surface of the substrate is B2, a value obtained by dividing an absolute difference value between B1 and B2 by a larger value of B1 and B2 is 0.04 or less.

In accordance with the first and second embodiments of the present invention, the thickness of the coating layer is preferably the thickness at a cutting edge portion thereof.

In accordance with a third embodiment of the present invention, the present invention can provide a surface-coated cutting tool including a coating layer formed on a substrate, coating layer including a compound layer, wherein assuming that the average thickness of the compound layer on a first surface and a second surface of the substrate is C, a difference between the maximum and minimum thicknesses of the compound layer is 0.04×C or less.

In accordance with a fourth embodiment of the present invention, the present invention can provide a surface-coated cutting tool including a coating layer formed on a substrate, the coating layer including a compound layer, wherein assuming that the average thickness of the compound layer on a first surface of the substrate is D1, and the average thickness of the compound layer on a second surface of the substrate is D2, a value obtained by dividing an absolute difference value between D1 and D2 by a larger value of D1 and D2 is 0.04 or less.

In accordance with the third and fourth embodiments of the present invention, the thickness of the compound layer is preferably the thickness at a cutting edge portion thereof.

In the surface-coated cutting tool of the present invention, the compound layer is preferably composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

In the surface-coated cutting tool of the present invention, the compound layer is preferably composed of or mainly composed of a compound of at least one element selected from the group consisting of boron, carbon, nitrogen, and oxygen, and titanium.

In the surface-coated cutting tool of the present invention, the compound layer is preferably composed of or mainly composed of a titanium carbonitride formed by a MT-CVD (Medium Temperature Chemical Vapor Deposition) method.

In the surface-coated cutting tool of the present invention, each of the first and second surfaces of the substrate can be a surface having the largest or second largest area among the surfaces of the substrate. The surface-coated cutting tool of the present invention exhibits a significant effect on a negative tip in which each of the surfaces of a coating layer formed on a first surface and a second surface of a substrate serves as a rake face.

In the surface-coated cutting tool of the present invention, the substrate is preferably composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

The surface-coated cutting tool is preferably used as a throw-away tip for drilling, end milling, milling, or turning, a metal saw, a gear cutting tool, a reamer, or a tapper.

ADVANTAGES

According to the present invention, a surface-coated cutting tool having a more stabilized tool life can be provided.

BRIEF DESCRIPTION OF DRAWINGS

FIG. 2(*b*) is a schematic sectional view of an example of a section on the lower surface side of the surface-coated cutting tool shown in FIG. 1, taken along line II-II.

Figure 1:
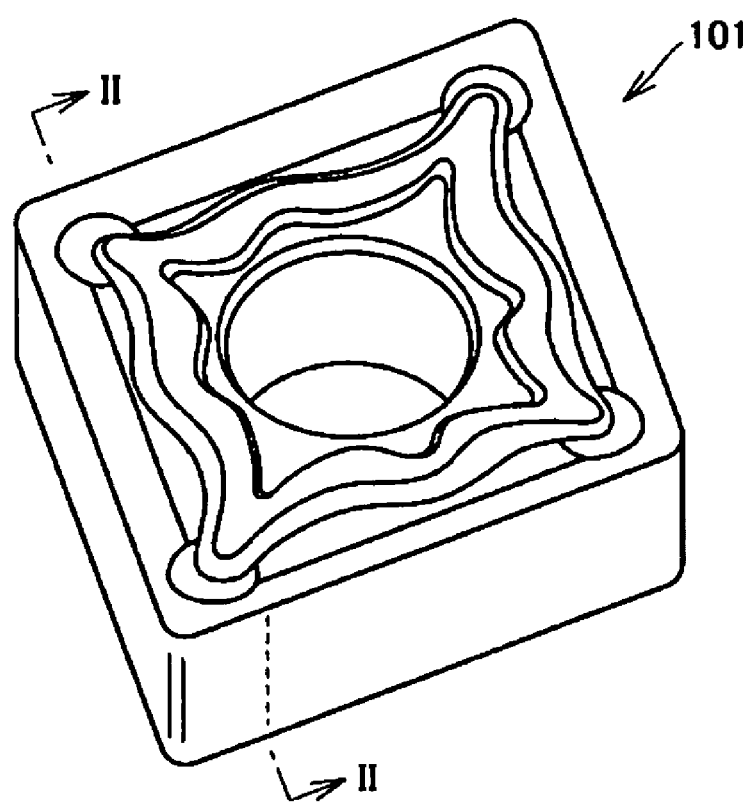
FIG. 1 is a schematic perspective view of a surface-coated cutting tool according to a preferred embodiment of the present invention.

REFERENCE NUMERALS 101 surface-coated cutting tool, 104 substrate, 105 side surface, 106 first surface, 107 second surface, 108 coating layer, 108a, 108b, 108c, 108d, 108e compound layer, 109 tray, 110 member, 11 rod-like member, 112 spacer, 113, 114, 115, 117 hypothetical line, 116 hypothetical tangent, 201, 204 hypothetical rake face, 201a, 204a hypothetical rake parallel face, 202, 205 hypothetical flank face, 202a, 205a hypothetical flank parallel face, 203, 206 hypothetical plane.

BEST MODE FOR CARRYING OUT THE INVENTION

The present invention will be described in further detail below. Hereinafter, description is made with reference to the drawings. In the drawings, the same reference numeral denote the same portion or corresponding portions. Each of the drawings is a schematic view for explanation, and the ratio of the thickness of a coating layer to the size of a body of a surface-coated cutting tool and the size ratio of the radius (R) of a corner may be different from actual values.

Figure 2:
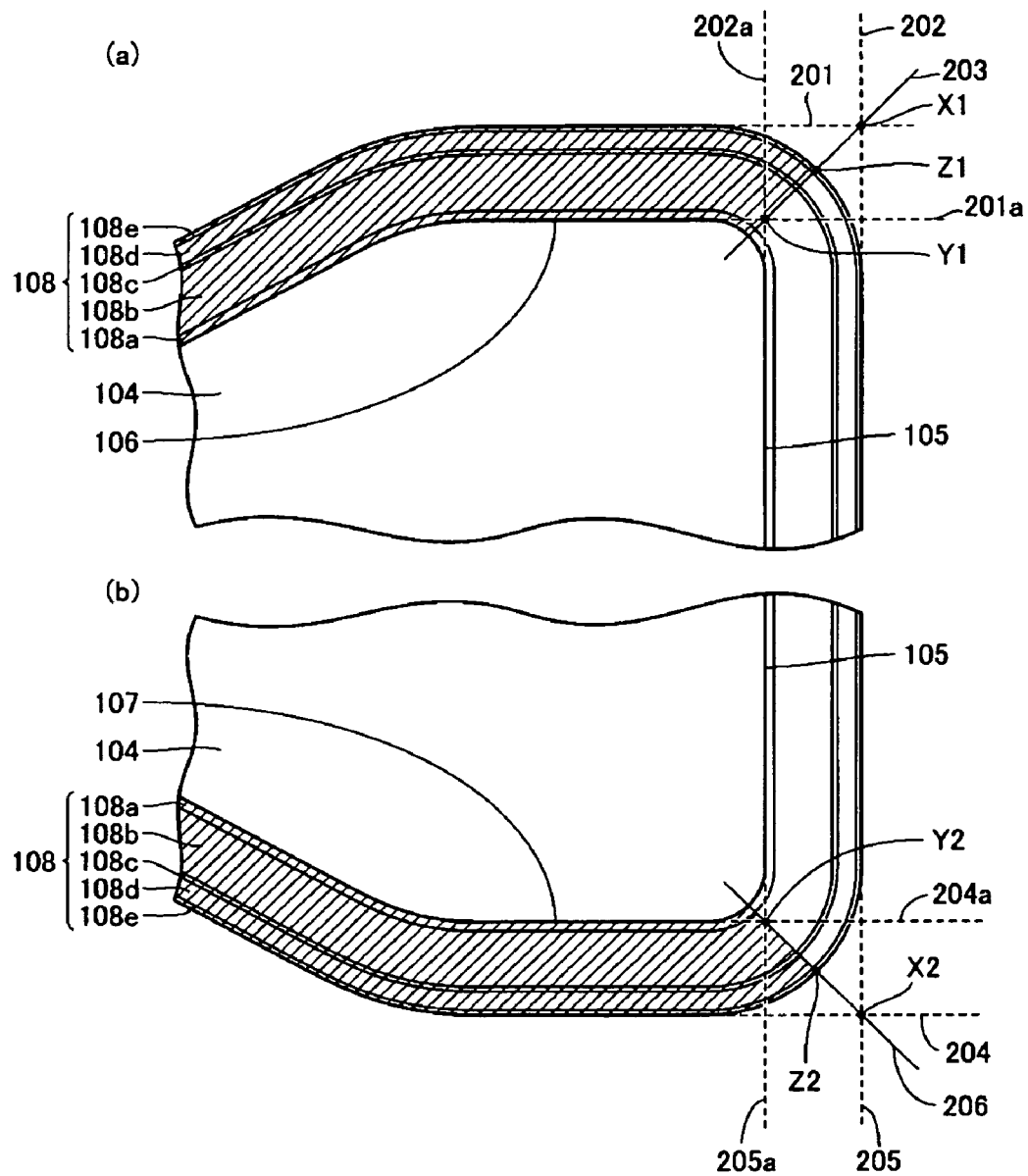
FIG. 2(*a*) is a schematic sectional view of an example of a section on the upper surface side of the surface-coated cutting tool shown in FIG. 1, taken along line II-II.

FIG. 1 is a schematic perspective view showing a surface-coated cutting tool according to a preferred embodiment of the present invention. FIG. 2(a) is a schematic sectional view of an example of a section on the upper surface side of the surface-coated cutting tool shown in FIG. 1, taken along line II-II; and FIG. 2(b) is a schematic sectional view of an example of a section on the lower surface side of the surface-coated cutting tool shown in FIG. 1, taken along line II-II.

As shown in FIGS. 2(a) and 2(b), a surface-coated cutting tool 101 of the present invention includes a coating layer 108 formed on a first surface 106 which is the top surface of a substrate 104, a second surface 107 which is the bottom surface of the substrate 104, and a side surface 105 of the substrate 104. The coating layer 108 includes compound layers 108a, 108b, 108c, 108d, and 108e which are laminated in that order from the substrate 104 side.

A first embodiment of the present invention is characterized in that assuming that the average thickness of the coating layer 108 on the first surface 106 and the second surface 107 of the substrate 104 is A, a difference between the maximum and minimum thicknesses of the coating layer 108 on the first surface 106 and the second surface 107 of the substrate 104 is 0.04×A or less.

This is based on the inventor's finding as a result of intensive research on the stabilization of a tool life that when the thickness of the coating layer 108 is set as in the first embodiment of the present invention, variations in the tool life of the surface-coated cutting tool 101 can be decreased to stabilize the tool life.

In accordance with a second embodiment of the present invention, assuming that the average thickness of the coating layer 108 on the first surface 106 of the substrate 104 is B1, and the average thickness of the coating layer 108 on the second surface 107 of the substrate 104 is B2, a value obtained by dividing an absolute difference value between B1 and B2 by a larger value of B1 and B2 is 0.04 or less.

This is based on the inventor's finding as a result of intensive research on the stabilization of a tool life that when the thickness of the coating layer 108 is set as in the second embodiment of the present invention, variations in the tool life of the surface-coated cutting tool 101 can be decreased to stabilize the tool life.

In accordance with the first and second embodiments of the present invention, the thickness of the coating layer 108 on the first surface 106 of the substrate 104 is the thickness of the coating layer 108 in at least a portion of a region (partially shown by oblique lines in FIG. 2(a)) of the first surface 106 inside an edge line Z1 of the surface-coated cutting tool 101 shown in FIG. 2(a).

Here, the edge line Z1 is a line of intersection between the outermost surface of the surface-coated cutting tool 101 and a hypothetical plane 230 including X1 and Y1 wherein X1 is a line of intersection between a hypothetical rake face 201 extended from the upper rake face (in contact with a workpiece to scoop the workpiece in cutting) and a hypothetical flank face 202 extended from a flank face (facing the workpiece after cutting with the rake face during cutting) of the surface-coated cutting tool 101, and Y1 is a line of intersection between a hypothetical rake parallel face 201a defined by moving the hypothetical rake face 201 until the hypothetical rake face 201 comes into contact with the first surface 106 of the substrate 104 and a hypothetical flank parallel face 202a defined by moving the hypothetical flank face 202 until the hypothetical flank face 202 comes into contact with the side surface 105 of the substrate 104.

In accordance with the first and second embodiments of the present invention, the thickness of the coating layer 108 on the second surface 107 of the substrate 104 is the thickness of the coating layer 108 in at least a portion of a region (partially shown by oblique lines in FIG. 2(b)) of the second surface 107 inside an edge line Z2 of the surface-coated cutting tool 101 shown in FIG. 2(b).

Here, the edge line Z2 is a line of intersection between the outermost surface of the surface-coated cutting tool 101 and a hypothetical plane 206 including X2 and Y2 wherein X2 is a line of intersection between a hypothetical rake face 204 extended from the lower rake face (in contact with a workpiece to scoop the workpiece in cutting) and a hypothetical flank face 205 extended from a flank face (facing the workpiece after cutting with the rake face during cutting) of the surface-coated cutting tool 101, and Y2 is a line of intersection between a hypothetical rake parallel face 204a defined by moving the hypothetical rake face 204 until the hypothetical rake face 204 comes into contact with the second surface 107 of the substrate 104 and a hypothetical flank parallel face 205a defined by moving the hypothetical flank face 202 until the hypothetical flank face 202 comes into contact with the side surface 105 of the substrate 104.

In accordance with the first and second embodiments of the present invention, the thickness of the coating layer in the cutting edge portion particularly preferably satisfies the relations of the first and second embodiments of the present invention. This is because since cutting with the surface-coated cutting tool 101 is performed by bringing the cutting edge portion of the surface-coated cutting tool 101 into contact with the workpiece, variations in the tool life of the surface-coated cutting tool 101 can be decreased to stabilize the tool life when the thickness of the coating layer in the cutting edge portion satisfies the relations of the first and second embodiments of the present invention.

On the top surface of the surface-coated cutting tool 101, a region of at least 2 mm from the edge line Z1 in a direction (the leftward direction in FIG. 2(a)) perpendicular to the edge line Z1 is used as the cutting edge portion. While on the bottom surface of the surface-coated cutting tool 101, a region of at least 2 mm from the edge line Z2 in a direction (the leftward direction in FIG. 2(b)) perpendicular to the edge line Z2 is used as the cutting edge portion.

Therefore, it is preferred that the thickness of the coating layer satisfies the relation of the first and/or second embodiment of the present invention in at least a portion of the region of at least 2 mm from the edge line Z1 in a direction (the leftward direction in FIG. 2(a)) perpendicular to the edge line Z1 on the top surface of the surface-coated cutting tool 101 and in at least a portion of the region of at least 2 mm from the edge line Z2 in a direction (the leftward direction in FIG. 2(b)) perpendicular to the edge line Z2 on the bottom surface of the surface-coated cutting tool 101.

In accordance with a third embodiment of the present invention, assuming that the average thickness of the compound layer on the first surface 106 and the second surface 107 of the substrate 104 is C, a difference between the maximum and minimum thicknesses of the compound layer is 0.04×C or less.

This is based on the inventor's finding as a result of intensive research on the stabilization of a tool life that when the thickness of the compound layer is set as in the third embodiment of the present invention, variations in the tool life of the surface-coated cutting tool 101 can be decreased to stabilize the tool life.

In accordance with a fourth embodiment of the present invention, assuming that the average thickness of the compound layer on the first surface 106 of the substrate 104 is D1, and the average thickness of the compound layer on the second surface 107 of the substrate 104 is D2, a value obtained by dividing an absolute difference value between D1 and D2 by a larger value of D1 and D2 is 0.04 or less.

This is based on the inventor's finding as a result of intensive research on the stabilization of a tool life that when the thickness of the compound layer is set as in the fourth embodiment of the present invention, variations in the tool life of the surface-coated cutting tool 101 can be decreased to stabilize the tool life.

In accordance with the third and fourth embodiments of the present invention, the thickness of the compound layer on the first surface 106 of the substrate 104 is the thickness of the compound layer in at least a portion of the region (partially shown by oblique lines in FIG. 2(a)) of the first surface 106 inside the edge line Z1 of the surface-coated cutting tool 101 shown in FIG. 2(a). The description of the edge line Z1 is the same as the above.

In accordance with the third and fourth embodiments of the present invention, the thickness of the compound layer on the second surface 107 of the substrate 104 is the thickness of the compound layer in at least a portion of the region (partially shown by oblique lines in FIG. 2(b)) of the second surface 107 inside the edge line Z2 of the surface-coated cutting tool 101 shown in FIG. 2(b). The description of the edge line Z1 is the same as the above.

In accordance with the third and fourth embodiments of the present invention, the thickness of the compound layer in the cutting edge portion particularly preferably satisfies the relations of the third and fourth embodiments of the present invention. This is because since cutting with the surface-coated cutting tool 101 is performed by bringing the cutting edge portion of the surface-coated cutting tool 101 into contact with the workpiece, when the thickness of the coating layer in the cutting edge portion satisfies the relations of the third and fourth embodiments of the present invention, variations in the tool life of the surface-coated cutting tool 101 can be decreased to stabilize the tool life.

The description of the cutting edge portion is the same as the above. Therefore, it is preferred that the thickness of the compound layer satisfies the relation of the third and/or fourth embodiment of the present invention in at least a portion of the region of at least 2 mm from the edge line Z1 in a direction (the leftward direction in FIG. 2(a)) perpendicular to the edge line Z1 on the top surface of the surface-coated cutting tool 101 and in at least a portion of the region of at least 2 mm from the edge line Z2 in a direction (the leftward direction in FIG. 2(b)) perpendicular to the edge line Z2 on the bottom surface of the surface-coated cutting tool 101.

The third and fourth embodiments of the present invention are applied to only a coating layer including a plurality of compounds layer, and the first and/or second embodiment of the present invention is applied to a coating layer including a single compound layer.

In the third and fourth embodiments of the present invention, the thickness of any one of the compound layers or the total thickness (excluding the total thickness of the coating layer 108) of a plurality of any ones of the compound layers at the same position (e.g., in the surface-coating cutting tool with the constitution shown in FIGS. 2(a) and 2(b), the compound layer 108a shown in FIGS. 2(a) and 2(b), the compound layer 108b shown in FIGS. 2(a) and 2(b), the compound layer 108c shown in FIGS. 2(a) and 2(b), the compound layer 108d shown in FIGS. 2(a) and 2(b), and the compound layer 108e shown in FIGS. 2(a) and 2(b)) may satisfy the relation of the third and/or fourth embodiment of the present invention.

The compound layer satisfying the relations according to the first to fourth embodiments of the present invention preferably includes at least one layer composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen. In this case, the tool life of the surface-coated cutting tool 101 of the present invention tends to be stabilized.

The compound layer satisfying the relations according to the first to fourth embodiments of the present invention preferably includes at least one layer composed of or mainly composed of a compound of at least one element selected from the group consisting of boron, carbon, nitrogen, and oxygen, and titanium. In this case, the tool life of the surface-coated cutting tool 101 of the present invention tends to be stabilized.

The compound layer satisfying the relations according to the first to fourth embodiments of the present invention preferably includes at least one layer composed of or mainly composed of a titanium carbonitride formed by a MT-CVD method. When the layer composed of a titanium carbonitride formed by the MT-CVD method corresponds to the compound layer satisfying the relations according to the first to fourth embodiments of the present invention, the tool life of the surface-coated cutting tool 101 of the present invention tends to be further stabilized. In the MT-CVD method, a layer composed of a titanium carbonitride can be formed by CVD using acetonitrile ($CH_3CN$) as a carbon source under the condition of a growth temperature (substrate temperature) of 700° C. to 1000° C.

In the present invention, the term "mainly composed" means that the compound layer is composed of the compound at a ratio of 50% by mass or more.

In the surface-coated cutting tool 101 of the present invention, the coating layer 108 can be formed by a conventional know method, for example, a CVD (Chemical Vapor Deposition) method or a PVD (Physical Vapor Deposition) method.

For example, when the coating layer 108 is formed by the CVD method, the substrate 104 is generally disposed on a tray and placed in an oven. However, the distance between the tray and the substrate 104 is little or not at all changed so that the thickness of the coating layer 108 formed on the first surface 106 of the substrate 104 and the thickness of the coating layer 108 on the second surface 107 can be set to satisfy the relations of the first to fourth embodiments.

Figure 3:
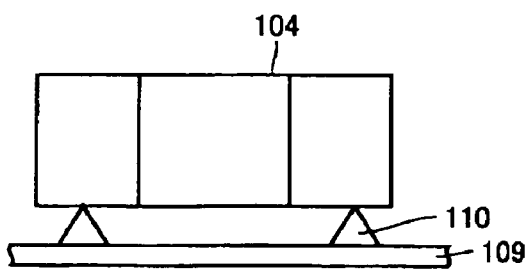
FIG. 3 is a schematic sectional view showing an example of a state in which a substrate is installed on a tray.

For example, as shown in a schematic sectional view of FIG. 3, triangular pyramid-shaped members 110 are placed between a tray 109 and the substrate 104, and the height of the members 110 is little or not at all changed so that the relations of the first to fourth embodiments can be satisfied.

For example, when the coating layer 108 is formed by the PVD method, a plurality of the substrates 104 is generally skewered with a rod-like member and placed in an oven. However, the distance between the skewered substrates 104 is little or not at all changed so that the relations of the first to fourth embodiments can be satisfied.

Figure 4:
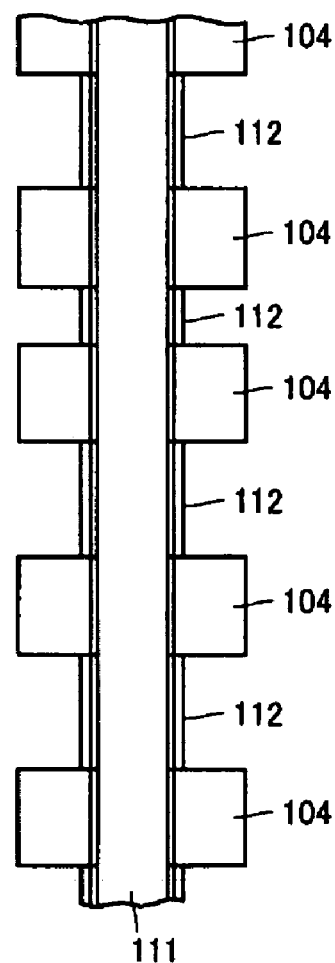
FIG. 4 is a schematic sectional view showing an example of a state in which substrates are skewered with a rod-like member.

For example, as shown in a schematic sectional view of FIG. 4, a plurality of the substrates 104 is skewered with a rod-like member 111, and spacers 112 are placed between the skewered substrates 104. The relations of the first to fourth embodiments can be satisfied by changing little or not at all the height of the spacers 112.

Namely, in the present invention, the coating layer 108 can be formed by any one of various methods using either the CVD method or the PVD method.

As the substrate 104 of the surface-coated cutting tool 101 of the present invention, any substrate can be used as long as it is generally known as a substrate for such applications. For example, the substrate is preferably composed of a WC-based cemented carbide (containing tungsten carbide and cobalt or further containing a carbonitride of titanium, tantalum or niobium), cermet (containing titanium carbide, titanium nitride, or titanium carbonitride as a main component), high-speed steel, ceramic (titanium carbide, silicon carbide, silicon nitride, aluminum nitride, or aluminum oxide), a cubic boron nitride sintered compact, a diamond sintered compact, a silicon nitride sintered compact, or a mixture of aluminum oxide and titanium carbide.

Each of the first surface 106 and the second surface 107 of the substrate 104 is preferably a surface having the largest or second largest area among the surfaces of the substrate 104. In other words, when the first surface 106 is a surface having the largest area among the surfaces of the substrate 104, the second surface 107 is preferably a surface having the second largest area among the surfaces of the substrate 104. When the second surface 107 is a surface having the largest area among the surfaces of the substrate 104, the first surface 106 is preferably a surface having the second largest area among the surfaces of the substrate 104. When the first surface 106 and the second surface 107 of the substrate 104 have the same area, both the first surface 106 and the second surface 107 of the substrate 104 are preferably surfaces having the largest area among the surfaces of the substrate 104.

The surface-coated cutting tool 101 of the present invention is preferably a negative tip (at least one of the angles formed by a rake face and a flank face is 90° or more) in which each of the surface of the coating layer 108 formed on the first surface 106 and the surface of the coating layer 108 formed on the second surface 107 of the substrate 104 preferably serves as a rake face.

The surface-coated cutting tool 101 of the present invention is preferably used as a throw-away tip for drilling, end milling, milling, or turning, a metal saw, a gear cutting tool, a reamer, or a tapper.

EXAMPLES

Example 1

First, a mixed powder containing TaC powder, NbC powder, TiC powder, Co powder, and WC powder (mass of TaC powder:mass of NbC powder:mass of TiC powder:mass of Co powder:mass of WC powder=3:2:1.5:6:87.5) was sintered at a temperature of 1430° C. for 1 hour to form a plurality of sintered compacts. The β-free layer of each of the resultant sintered compacts had a thickness of 17 μm.

Next, each of the sintered compacts was subjected to edge processing and honing in a length of 0.06 mm from a rake face with a SiC brush to prepare a substrate having the same shape as CNMG120408N-UX manufactured by Sumitomo Electric Hardmetal Corp.

Then, triangular pyramid-shaped members with desired heights were placed on a flat surface of the same tray, and the substrates were placed on the triangular pyramid-shaped members.

Then, a TiN layer, a MT-TiCN layer, a TiBN layer, a $\alpha$-$Al_2O_3$ layer and a TiN layer were sequentially deposited on a surface of each substrate by a generally known CVD method to form a coating layer. As a result, surface-coated cutting tools of Example 1 were prepared. The term "MT-TiCN layer" represents a TiCN layer formed by the MT-CVD method.

Each of the surface-coated cutting tools of Example 1 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 1 had cutting edges 1 and 2 having a vertex angle (an angle formed by two adjacent edge lines Z1) of 80° on the upper surface side and cutting edges 3 and 4 having a vertex angle (an angle formed by two adjacent edge lines Z2) of 80° on the lower surface side.

In each of the surface-coated cutting tools of Example 1, the thickness of each of the layers constituting the coating layer and the total thickness of the coating layer were measured. The results are shown in Table I. The unit of the thickness of each layer and the total thickness of the coating layer shown in Table I is μm.

Figure 5:
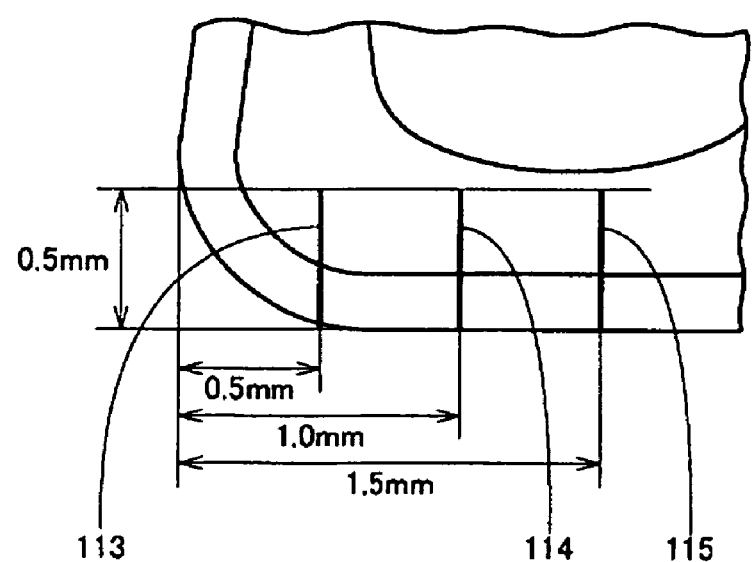
FIG. 5 is an enlarged schematic plan view showing measurement positions of the thickness of a coating layer or each of layers constituting the coating layer in Examples 1 to 4 and Comparative Examples 1 and 2.

The thickness of each of the layers shown in Table I is an average value calculated from the measured values measured as follows: As shown in an enlarged schematic plan view of FIG. 5, each of the sections taken along hypothetical lines 113, 114, and 115 each of which extended by 0.5 mm inward from each of the edge lines Z1 and Z2 in a direction perpendicular to the edge line and parallel to the rake face was lapped at ten positions on each of the hypothetical lines, and the thickness of each layer and the total thickness of the coating layer shown in Table I were measured by a metallographic microscope at a total of 30 points in each surface-coated cutting tool.

In Table I, each of A value, B value, C value, and D value is an average value calculated from the calculated A values, B values, C values, and D values calculated from the measured values of each surface-coated cutting tool of Example 1 according to the respective equations below. Each of the A value, B value, C value, and D value was a value rounded to three decimal places.

A value=(absolute difference value between maximum and minimum thicknesses of entire coating layer)/(average thickness of entire coating layer)

B value=(absolute difference value between average thicknesses of entire coating layer on upper surface side and lower surface side)/(larger average value of average thickness of entire coating layer on upper surface side and average thickness of entire coating layer on lower surface side)

C value=(absolute difference value between maximum and minimum thicknesses of MT-TiCN layer)/(average thickness of MT-TiCN layer)

D value=(absolute difference value between average thicknesses of MT-TiCN layer on upper surface side and lower surface side)/(larger average value of average thickness of Mt-TiCN layer on upper surface side and average thickness of MT-TiCN layer on lower surface side)

Further, a cutting test was performed using each of the cutting edges 1 to 4 the plurality of surface-coated cutting tools of Example 1 under the cutting test conditions below. The results are shown in Table II.

The tool life was represented by a cutting time (seconds) taken until the amount of edge flank wear exceeded 0.2 mm and/or the edge was damaged. In the column "Average tool life (seconds)" in Table II, an average tool life (seconds) of a total of 40 cutting edges 1 to 4 of ten surface-coated cutting tools is shown. Further, in the column "Standard deviation of tool life" in Table II, a standard deviation of the tool lives (seconds) of a total of 40 cutting edges 1 to 4 of ten surface-coated cutting tools is shown.

<Cutting Test Conditions>

Holder used: PCLNR2525-43 (manufactured by Sumitomo Electric Hardmetal Corp.)

Workpiece: SCM420H, HB=205 (including intermittent cutting)

Cutting speed: 196 m/min

Feed: 0.27 to 0.35 mm/rev.

Depth of cut: 1.5 mm

Cutting oil: water-soluble oil

Table II indicates that the average tool life of the surface-coated cutting tools of Example 1 is 802 seconds, and the standard deviation is 90.

Example 2

A plurality of surface-coated cutting tools of Example 2 was formed by the same method under the same conditions as in Example 1 except that each layer constituting a coating layer was formed by the CVD method under forming conditions different from those in Example 1.

Each of the surface-coated cutting tools of Example 2 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 2 had cutting edges 1 and 2 having a vertex angle of 80° on the upper surface side and cutting edges 3 and 4 having a vertex angle of 80° on the lower surface side.

In each of the surface-coated cutting tools of Example 2, the thickness of each of the layers constituting the coating layer and the total thickness of the coating layer were measured by the same method as in Example 1. The results are shown in Table I.

A cutting test was carried out by the same method under the same conditions as in Example 1 using each of the cutting edges 1 to 4 of 10 surface-coated cutting tools of Example 2, and the tool life was evaluated on the basis of the same standard as in Example 1. The results are shown in Table II.

Table II indicates that the average tool life of the surface-coated cutting tools of Example 2 is 783 seconds, and the standard deviation is 127.

Comparative Example 1

A plurality of surface-coated cutting tools of Comparative Example 1 was formed by the same method under the same conditions as in Example 1 except that each layer constituting a coating layer was formed by the CVD method under forming conditions different from those in Example 1.

In each of the surface-coated cutting tools of Comparative Example 1, the thickness of each of the layers constituting the coating layer and the total thickness of the coating layer were measured by the same method as in Example 1. The results are shown in Table I.

A cutting test was carried out by the same method under the same conditions as in Example 1 using each of the cutting edges 1 to 4 of 10 surface-coated cutting tools of Comparative Example 1, and the tool life was evaluated on the basis of the same standard as in Example 1. The results are shown in Table II.

Table II indicates that the average tool life of the surface-coated cutting tools of Comparative Example 1 is 689 seconds, and the standard deviation is 218.

TABLE I

| | | Thickness of each layer constituting coating layer (μm) | | | | | | | | |
|---|---|---|---|---|---|---|---|---|---|---|
| | | TiN layer | MT-TiCN layer | TiBN layer | $\alpha\text{-Al}_2\text{O}_3$ layer | TiN layer | Total | A value | B value | C value | D value |
| Example 1 | Upper cutting edge 1 | 1.06 | 6.07 | 0.52 | 2.12 | 0.49 | 10.26 | 0.009 | 0.008 | 0.010 | 0.008 |
| | Upper cutting edge 2 | 1.06 | 6.08 | 0.52 | 2.11 | 0.49 | 10.26 | | | | |
| | Lower cutting edge 3 | 1.05 | 6.03 | 0.51 | 2.11 | 0.48 | 10.18 | | | | |
| | Lower cutting edge 4 | 1.04 | 6.02 | 0.51 | 2.12 | 0.48 | 10.17 | | | | |
| Example 2 | Upper cutting edge 1 | 1.08 | 6.13 | 0.53 | 2.12 | 0.50 | 10.36 | 0.033 | 0.030 | 0.043 | 0.041 |
| | Upper cutting edge 2 | 1.09 | 6.14 | 0.52 | 2.13 | 0.51 | 10.39 | | | | |
| | Lower cutting edge 3 | 1.05 | 5.88 | 0.52 | 2.12 | 0.48 | 10.05 | | | | |
| | Lower cutting edge 4 | 1.04 | 5.89 | 0.52 | 2.13 | 0.49 | 10.07 | | | | |

TABLE I-continued

| | | Thickness of each layer constituting coating layer (μm) | | | | | | | | | |
|---|---|---|---|---|---|---|---|---|---|---|---|
| | | TiN layer | MT-TiCN layer | TiBN layer | α-Al$_2$O$_3$ layer | TiN layer | Total | A value | B value | C value | D value |
| Comparative Example 1 | Upper cutting edge 1 | 1.12 | 6.30 | 0.54 | 2.13 | 0.51 | 10.60 | 0.078 | 0.073 | 0.105 | 0.098 |
| | Upper cutting edge 2 | 1.11 | 6.31 | 0.55 | 2.14 | 0.51 | 10.62 | | | | |
| | Lower cutting edge 3 | 1.07 | 5.69 | 0.51 | 2.11 | 0.47 | 9.85 | | | | |
| | Lower cutting edge 4 | 1.07 | 5.68 | 0.50 | 2.11 | 0.46 | 9.82 | | | | |

TABLE II

| | | Average tool life (sec) | Standard deviation of tool life |
|---|---|---|---|
| Example 1 | Upper cutting edge 1 | 802 | 90 |
| | Upper cutting edge 2 | | |
| | Lower cutting edge 3 | | |
| | Lower cutting edge 4 | | |
| Example 2 | Upper cutting edge 1 | 783 | 127 |
| | Upper cutting edge 2 | | |
| | Lower cutting edge 3 | | |
| | Lower cutting edge 4 | | |
| Comparative Example 1 | Upper cutting edge 1 | 689 | 218 |
| | Upper cutting edge 2 | | |
| | Lower cutting edge 3 | | |
| | Lower cutting edge 4 | | |

As seen from the results shown in Tables I and II, it was confirmed that the surface-coated cutting tools of Examples 1 and 2 in each of which each of the A and B values is 0.04 or less show longer tool lives and stabilized tool lives, as compared with the surface-coated cutting tool of Comparative Example 1 in which each of the A and B values exceeds 0.04.

The possible reason why the tool life of each of the surface-coated cutting tools of Examples 1 and 2 is increased as compared with Comparative Example 1 is that the tool life of each of the surface-coated cutting tools of Examples 1 and 2 is normally worn out, but chipping occurs in the cutting edges 1 and 2 on the upper surface side of Comparative Example 1, thereby decreasing the tool life of the surface-coated cutting tool of Comparative Example 1.

Example 3

First, a mixed powder containing TaC powder, Cr$_3$C$_2$ powder, Co powder, and WC powder (mass of TaC powder:mass of Cr$_3$C$_2$ powder:mass of Co powder:mass of WC powder=0.3:0.2:10:89.5) was sintered at a temperature of 1400° C. for 1 hour to form a plurality of sintered compacts. A β-free layer was not formed in each of the resultant sintered compacts.

Next, each of the sintered compacts was subjected to edge processing and honing in a length of 0.03 mm from a rake face with a SiC brush to prepare a substrate having the same shape as CNMG120408N-EX manufactured by Sumitomo Electric Hardmetal Corp.

Then, the substrates were arranged with spacers provided therebetween and skewered with a rod-like member. Then, a TiAlN layer was deposited on the surface of each of the substrates by a conventional know PVD method to form a coating layer. As a result, surface-coated cutting tools of Example 3 were prepared.

Each of the surface-coated cutting tools of Example 3 was a negative tip in which each of the upper and lower surfaces having the largest area served as a rake face, and the other surface, i.e., the side surface, served as a flank face, and each of the angles formed by the rake faces and the flank face was 90°.

In each of the surface-coated cutting tools of Example 3, the thickness of the coating layer including the TiAlN layer was measured by the same method as in Example 1. The results are shown in Table III. In Table III, the thickness of the TiAlN layer and the A and B values are described according to the notations of Table I.

Further, a cutting test was performed using each of the cutting edges 1 to 4 of ten surface-coated cutting tools of Example 3 under the cutting test conditions below, and the tool life was evaluated. The results are shown in Table IV.

The tool life was represented by a cutting time (seconds) taken to at least one of the times when the amount of edge flank wear exceeded 0.2 mm, when the edge was defected, and when the surface roughness Rz (JIS B 0601-1994) of the workpiece described below exceeded 2.0 μm. In Table IV, the notations correspond to those in Table II.

<Cutting Test Conditions>

Holder used: PCLNR2525-43 (manufactured by Sumitomo Electric Hardmetal Corp.)

Workpiece: SUS304 drawing material, HB=155 (including intermittent cutting)

Cutting speed: 140 m/min

Feed: 0.28 mm/rev.

Depth of cut: 2.0 mm

Cutting oil: water-soluble oil

Table IV indicates that the average tool life of the surface-coated cutting tools of Example 3 is 125 seconds, and the standard deviation is 6.3.

Example 4

A plurality of surface-coated cutting tools of Example 4 was formed by the same method under the same conditions as in Example 3 except that a TiAlN layer was formed by the PVD method under forming conditions different from those in Example 3.

Each of the surface-coated cutting tools of Example 4 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tools of Example 4 had cutting edges 1 and 2 having a vertex angle of 80° on the upper surface side and cutting edges 3 and 4 having a vertex angle of 80° on the lower surface side.

In each of the surface-coated cutting tools of Example 4, the thickness of the TiAlN layer was measured by the same method as in Example 3. The results are shown in Table III.

A cutting test was carried out by the same method under the same conditions as in Example 3 using each of the cutting edges 1 to 4 of 10 surface-coated cutting tools of Example 4, and the tool life was evaluated on the basis of the same standard as in Example 3. The results are shown in Table IV.

Table IV indicates that the average tool life of the surface-coated cutting tools of Example 4 is 120 seconds, and the standard deviation is 8.1.

Comparative Example 2

A plurality of surface-coated cutting tools of Comparative Example 2 was formed by the same method under the same conditions as in Example 3 except that a TiAlN layer was formed by the PVD method under forming conditions different from those in Example 3.

In each of the surface-coated cutting tools of Comparative Example 2, the thickness of the TiAlN layer was measured by the same method as in Example 3. The results are shown in Table III.

A cutting test was carried out by the same method under the same conditions as in Example 3 using each of the cutting edges 1 to 4 of 10 surface-coated cutting tools of Comparative Example 2, and the tool life was evaluated on the basis of the same standard as in Example 3. The results are shown in Table IV.

Table IV indicates that the average tool life of the surface-coated cutting tools of Comparative Example 2 is 117 seconds, and the standard deviation is 17.8.

TABLE III

| | | Thickness of TiAlN layer (μm) | A value | B value |
|---|---|---|---|---|
| Example 3 | Upper cutting edge 1 | 4.13 | 0.010 | 0.008 |
| | Upper cutting edge 2 | 4.13 | | |
| | Lower cutting edge 3 | 4.10 | | |
| | Lower cutting edge 4 | 4.09 | | |
| Example 4 | Upper cutting edge 1 | 4.18 | 0.034 | 0.031 |
| | Upper cutting edge 2 | 4.17 | | |
| | Lower cutting edge 3 | 4.05 | | |
| | Lower cutting edge 4 | 4.04 | | |
| Comparative Example 2 | Upper cutting edge 1 | 4.25 | 0.080 | 0.073 |
| | Upper cutting edge 2 | 4.27 | | |
| | Lower cutting edge 3 | 3.94 | | |
| | Lower cutting edge 4 | 3.96 | | |

TABLE IV

| | | Average tool life (sec) | Standard deviation of tool life |
|---|---|---|---|
| Example 3 | Upper cutting edge 1 | 125 | 6.3 |
| | Upper cutting edge 2 | | |
| | Lower cutting edge 3 | | |
| | Lower cutting edge 4 | | |
| Example 4 | Upper cutting edge 1 | 120 | 8.1 |
| | Upper cutting edge 2 | | |
| | Lower cutting edge 3 | | |
| | Lower cutting edge 4 | | |
| Comparative Example 2 | Upper cutting edge 1 | 117 | 17.8 |
| | Upper cutting edge 2 | | |
| | Lower cutting edge 3 | | |
| | Lower cutting edge 4 | | |

As seen from the results shown in Tables III and IV, it was confirmed that the surface-coated cutting tools of Examples 3 and 4 in each of which each of the values A and B is 0.04 or less show longer tool lives and stabilized tool lives, as compared with the surface-coated cutting tool of Comparative Example 2 in which each of the values A and B exceeds 0.04.

Example 5

First, a mixed powder containing TiC powder, TaC powder, NbC powder, Co powder, and WC powder (mass of TiC powder:mass of TaC powder:mass of NbC powder:mass of Co powder:mass of WC powder=0.3:0.6:0.3:5.2:93.6) was sintered at a temperature of 1450° C. for 1 hour to form a plurality of sintered compacts. A β-free layer was not formed in each of the resultant sintered compacts.

Next, each of the sintered compacts was subjected to edge processing and honing in a length of 0.04 mm from a rake face with a SiC brush to prepare a substrate (without a chip breaker) having the same shape as CNMA120408 specified in JIS B 4120-1998.

Then, triangular pyramid-shaped members with desired heights were placed on a flat surface of the same tray, and the substrates were placed on the triangular pyramid-shaped members.

Then, a TiN layer, a MT-TiCN layer, a TiBN layer, a $\alpha$-$Al_2O_3$ layer, and a TiN layer were sequentially deposited on a surface of each substrate by a generally known CVD method to form a coating layer. As a result, surface-coated cutting tools of Example 5 were prepared. The term "MT-TiCN layer" represents a TiCN layer formed by the MT-CVD method.

Each of the surface-coated cutting tools of Example 5 was a negative tip in which each of the upper and lower surfaces having the largest area served as a rake face, and the other surface, i.e., the side surface, served as a flank face, and each of the angles formed by the rake faces and the flank face was 90°. Each of the surface-coated cutting tool 101 of Example 5 had cutting edges 1 and 2 having a vertex angle (an angle formed by two adjacent edge lines Z1) of 80° on the upper surface side and cutting edges 3 and 4 having a vertex angle (an angle formed by two adjacent edge lines Z2) of 80° on the lower surface side.

In each of the surface-coated cutting tools of Example 5, the thickness of each of the layers constituting the coating layer and the total thickness of the coating layer were measured. The results are shown in Table V. The unit of the thickness of each layer and the total thickness of the coating layer shown in Table V is μm.

Figure 6:
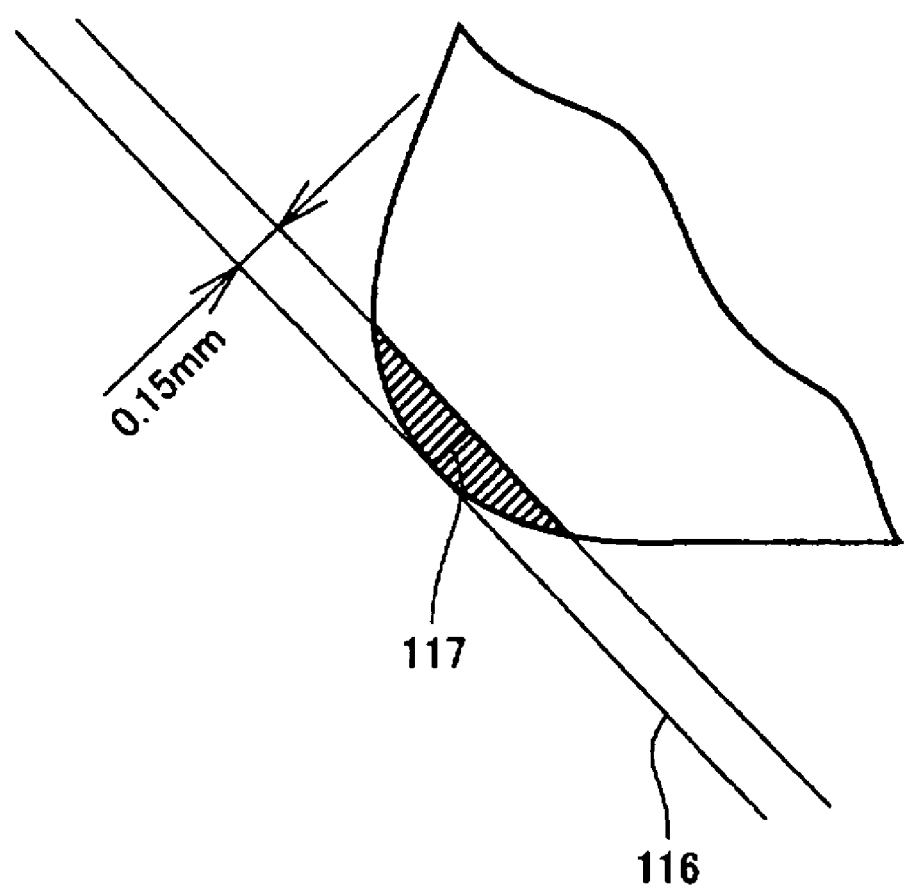
FIG. 6 is an enlarged schematic plan view showing a thickness measurement position and a position used as a cutting edge of each of layers constituting a coating layer in Examples 5 and 6 and Comparative Example 3.

The thickness of each of the layers and the total thickness of the coating layer shown in Table V are average values calculated from the measured values measured as follows: As shown in an enlarged schematic plan view of FIG. 6, in a region (a shadowed region in FIG. 6) of 0.15 mm in an inward direction perpendicular to a hypothetical tangent 116 to the circular-arc end portion of each of the cutting edges 1 to 4 of each surface-coated cutting tool of Example 5, a section taken along a hypothetical line 117 drawn perpendicularly to the hypothetical tangent 116 from the contact between the circular-arc curved end portion and the hypothetical tangent 116 of each of the cutting edges 1 to 4 was lapped at ten positions on the hypothetical line 117. The thickness of each layer and the total thickness of the coating layer were measured with a metallographic microscope at a total of 10 positions in each surface-coated cutting tool, and the measured values were averaged.

In Table V, the thickness of each of the layers constituting the coating layer, the total thickness of the coating layer, and each of A value, B value, C value, and D value are described according to the notations in Table 1.

Further, a cutting test was performed using each of the cutting edges 1 to 4 of ten surface-coated cutting tools of Example 5 under the cutting test conditions below, and the tool life was evaluated. The results are shown in Table VI. The tool life was evaluated in the same method as in Example 3. In Table VI, the notations correspond to those in Table II.

<Cutting Test Conditions>
Holder used: PCLNR2525-43 (manufactured by Sumitomo Electric Hardmetal Corp.)
Workpiece: FCD450, HB=230 (including intermittent cutting)
Cutting speed: 155 m/min
Feed: 0.31 to 0.36 mm/rev.
Depth of cut: 2 mm
Cutting oil: water-soluble oil A cutting test was carried out by bringing each of the cutting edges 1 to 4 (a shadowed portion in FIG. 6) of ten surface-coated cutting tools of Comparative Example 3 into contact with the workpiece under the same conditions as in Example 5, and the tool life was evaluated by the same method as in Example 5. The results are shown in Table VI.

Table VI indicates that the average tool life of the surface-coated cutting tools of Comparative Example 3 is 537 seconds, and the standard deviation is 201.

TABLE V

| | | Thickness of each layer constituting coating layer (μm) | | | | | | | | | |
|---|---|---|---|---|---|---|---|---|---|---|---|
| | | TiN layer | MT-TiCN layer | TiBN layer | α-Al$_2$O$_3$ layer | TiN layer | Total | A value | B value | C value | D value |
| Example 5 | Upper cutting edge 1 | 0.72 | 8.14 | 0.44 | 4.11 | 0.49 | 13.90 | 0.004 | 0.003 | 0.002 | 0.002 |
| | Upper cutting edge 2 | 0.72 | 8.14 | 0.43 | 4.11 | 0.49 | 13.89 | | | | |
| | Lower cutting edge 3 | 0.71 | 8.13 | 0.43 | 4.10 | 0.48 | 13.85 | | | | |
| | Lower cutting edge 4 | 0.72 | 8.12 | 0.43 | 4.10 | 0.48 | 13.85 | | | | |
| Example 6 | Upper cutting edge 1 | 0.72 | 8.28 | 0.44 | 4.14 | 0.50 | 14.08 | 0.030 | 0.029 | 0.042 | 0.040 |
| | Upper cutting edge 2 | 0.71 | 8.27 | 0.45 | 4.13 | 0.51 | 14.07 | | | | |
| | Lower cutting edge 3 | 0.71 | 7.94 | 0.42 | 4.12 | 0.47 | 13.66 | | | | |
| | Lower cutting edge 4 | 0.70 | 7.95 | 0.42 | 4.11 | 0.48 | 13.66 | | | | |
| Comparative Example 3 | Upper cutting edge 1 | 0.72 | 8.58 | 0.44 | 4.12 | 0.51 | 14.37 | 0.073 | 0.068 | 0.103 | 0.097 |
| | Upper cutting edge 2 | 0.72 | 8.57 | 0.43 | 4.11 | 0.51 | 14.34 | | | | |
| | Lower cutting edge 3 | 0.69 | 7.75 | 0.41 | 4.09 | 0.47 | 13.41 | | | | |
| | Lower cutting edge 4 | 0.68 | 7.74 | 0.40 | 4.08 | 0.46 | 13.36 | | | | |

Table VI indicates that the average tool life of the surface-coated cutting tools of Example 5 is 615 seconds, and the standard deviation is 111.

Example 6

A plurality of surface-coated cutting tools of Example 6 was formed by the same method under the same conditions as in Example 5 except that a coating layer was formed under conditions different from those in Example 5.

In each of the surface-coated cutting tools of Example 6, the thickness of each of the layers constituting the coating layer and the total thickness of the coating layer were measured by the same method as in Example 5. The results are shown in Table V.

A cutting test was carried out by bringing each of the cutting edges 1 to 4 (a shadowed portion in FIG. 6) of ten surface-coated cutting tools of Example 6 into contact with the workpiece under the same conditions as in Example 5, and the tool life was evaluated by the same method as in Example 5. The results are shown in Table VI.

Table VI indicates that the average tool life of the surface-coated cutting tools of Example 6 is 601 seconds, and the standard deviation is 132.

Comparative Example 3

A plurality of surface-coated cutting tools of Comparative Example 3 was formed by the same method under the same conditions as in Example 5 except that a coating layer was formed under conditions different from those in Example 5.

In each of the surface-coated cutting tools of Comparative Example 3, the thickness of each of the layers constituting the coating layer and the total thickness of the coating layer were measured by the same method as in Example 5. The results are shown in Table V.

TABLE VI

| | | Average tool life (sec) | Standard deviation of tool life |
|---|---|---|---|
| Example 5 | Upper cutting edge 1 Upper cutting edge 2 Lower cutting edge 3 Lower cutting edge 4 | 615 | 111 |
| Example 6 | Upper cutting edge 1 Upper cutting edge 2 Lower cutting edge 3 Lower cutting edge 4 | 601 | 132 |
| Comparative Example 3 | Upper cutting edge 1 Upper cutting edge 2 Lower cutting edge 3 Lower cutting edge 4 | 537 | 201 |

As seen from the results shown in Tables V and VI, it was confirmed that the surface-coated cutting tools of Examples 5 and 6 in each of which each of the A and B values is 0.04 or less show longer tool lives and stabilized tool lives, as compared with the surface-coated cutting tool of Comparative Example 3 in which each of the A and B values exceeds 0.04.

Each of the surface-coated cutting tools of Examples 1 to 4 is provided with a chip breaker, while each of the surface-coated cutting tools of Examples 5 and 6 is not provided with a chip breaker. However, it is thought that the same effect can be obtained regardless of the presence of the chip breaker.

It is also thought that even when the surface of the coating layer of each of the surface-coated cutting tools of Examples 1 to 6 is processed by blasting, barreling, or brushing, the effect of the present invention is maintained.

It is further thought that although the coating layer of each of the surface-coated cutting tools of Example 53 and 4 includes a signal layer, the same effect as in Examples 3 and 4 can be obtained even when the coating layer includes a plurality of layers.

In each of the above-described TiN layer, MT-TiCN layer, TiBN layer, and TiAlN layer, the element composition need not necessarily be a stoichiometric composition.

It should be thought that all the disclosed embodiments and examples are illustrative but are not limitative in all aspects. It is intended that the scope of the present invention is described in the claims not in the above description and includes meaning equivalent to those in the claims and any change within the scope of the present invention.

INDUSTRIAL APPLICABILITY

When, for example, 10, preferably 50, more preferably 100, and most preferably all products of surface-coated cutting tools satisfy the relation according to at least one of the first to fourth embodiments, there is the advantage that not only the tool life can be stabilized but also stable cutting can be performed using any one of the cutting edges of any surface-coated cutting tool.

The invention claimed is:

1. A surface-coated cutting tool comprising a coating layer formed on a substrate, wherein assuming that the average thickness of the coating layer on a first surface and a second surface of the substrate is A, a difference between the maximum and minimum thicknesses of the coating layer is 0.04×A or less,
wherein the thickness of the coating layer is the thickness at a cutting edge portion of the coating layer,
wherein the first surface or the second surface of the substrate is a surface having the largest area among surfaces of the substrate and the second surface is an opposite side of the first surface, and
wherein the surface-coated cutting tool is a negative tip in which each of the surfaces of the coating layer formed on the first surface and the coating layer formed on the second surface of the substrate serves as a rake face.

2. The surface-coated cutting tool according to claim 1, wherein the substrate is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

3. The surface-coated cutting tool according to claim 1, wherein the surface-coated cutting tool is used as a throwaway tip for drilling, end milling, milling, or turning, a metal saw, a gear cutting tool, a reamer, or a tapper.

4. A surface-coated cutting tool comprising a coating layer formed on a substrate, wherein assuming that the average thickness of the coating layer on a first surface of the substrate is B1, and the average thickness of the coating layer on a second surface of the substrate is B2, a value obtained by dividing an absolute difference value between B1 and B2 by a larger value of B1 and B2 is 0.04 or less,
wherein the thickness of the coating layer is the thickness at a cutting edge portion of the coating layer,
wherein the first surface or the second surface of the substrate is a surface having the largest area among surfaces of the substrate and the second surface is an opposite side of the first surface, and
wherein the surface-coated cutting tool is a negative tip in which each of the surfaces of the coating layer formed on the first surface and the coating layer formed on the second surface of the substrate serves as a rake face.

5. The surface-coated cutting tool according to claim 4, wherein the substrate is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

6. The surface-coated cutting tool according to claim 4, wherein the surface-coated cutting tool is used as a throwaway tip for drilling, end milling, milling, or turning, a metal saw, a gear cutting tool, a reamer, or a tapper.

7. A surface-coated cutting tool comprising a coating layer formed on a substrate, the coating layer including a compound layer, wherein assuming that the average thickness of the compound layer on a first surface and a second surface of the substrate is C, a difference between the maximum and minimum thicknesses of the compound layer is 0.04×C or less,
wherein the thickness of the compound layer is the thickness at a cutting edge portion of the compound layer,
wherein the first surface or the second surface of the substrate is a surface having the largest area among surfaces of the substrate and the second surface is an opposite side of the first surface, and
wherein the surface-coated cutting tool is a negative tip in which each of the surfaces of the coating layer formed on the first surface and the coating layer formed on the second surface of the substrate serves as a rake face.

8. The surface-coated cutting tool according to claim 7, wherein the compound layer is composed or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

9. The surface-coated cutting tool according to claim 7, wherein the compound layer is composed of or mainly composed of a compound of at least one element selected from the group consisting of boron, carbon, nitrogen, and oxygen, and titanium.

10. The surface-coated cutting tool according to claim 7, wherein the compound layer is composed of or mainly composed of a titanium carbonitride formed by a MT-CVD method.

11. The surface-coated cutting tool according to claim 7, wherein the substrate is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

12. The surface-coated cutting tool according to claim 7, wherein the surface-coated cutting tool is used as a throwaway tip for drilling, end milling, milling, or turning, a metal saw, a gear cutting tool, a reamer, or a tapper.

13. A surface-coated cutting tool comprising a coating layer formed on a substrate, the coating layer including a compound layer, wherein assuming that the average thickness of the compound layer on a first surface of the substrate is D1, and the average thickness of the compound layer on a second surface of the substrate is D2, a value obtained by dividing an absolute difference value between D1 and D2 by a larger value of D1 and D2 is 0.04 or less,
wherein the thickness of the compound layer is the thickness at a cutting edge portion of the compound layer,
wherein the first surface or the second surface of the substrate is a surface having the largest area among surfaces of the substrate and the second surface is an opposite side of the first surface, and
wherein the surface-coated cutting tool is a negative tip in which each of the surfaces of the coating layer formed on the first surface and the coating layer formed on the second surface of the substrate serves as a rake face.

14. The surface-coated cutting tool according to claim 13, wherein the compound layer is composed of or mainly composed of a compound of at least one element selected from the group consisting of titanium, zirconium, hafnium, vanadium, niobium, tantalum, chromium, molybdenum, tungsten, aluminum, and silicon, and at least one element selected from the group consisting of boron, carbon, nitrogen, and oxygen.

15. The surface-coated cutting tool according to claim 13, wherein the compound layer is composed of or mainly composed of a compound of at least one element selected from the group consisting of boron, carbon, nitrogen, and oxygen, and titanium.

16. The surface-coated cutting tool according to claim 13, wherein the compound layer is composed of or mainly composed of a titanium carbonitride formed by a MT-CVD method.

17. The surface-coated cutting tool according to claim 13, wherein the substrate is composed of at least one selected from the group consisting of a WC-based cemented carbide, cermet, high-speed steel, ceramic, a cubic boron nitride sintered compact, a diamond sintered compact, a silicon nitride sintered compact, aluminum oxide, and titanium carbide.

18. The surface-coated cutting tool according to claim 13, wherein the surface-coated cutting tool is used as a throwaway tip for drilling, end milling, milling, or turning, a metal saw, a gear cutting tool, a reamer, or a tapper.

\* \* \* \* \*

UNITED STATES PATENT AND TRADEMARK OFFICE
CERTIFICATE OF CORRECTION

PATENT NO. : 7,967,533 B2  
APPLICATION NO. : 12/094236  
DATED : June 28, 2011  
INVENTOR(S) : Naoya Omori et al.

Page 1 of 1

It is certified that error appears in the above-identified patent and that said Letters Patent is hereby corrected as shown below:

Column 18, line 13, change "laver" to --layer--.

Signed and Sealed this
Sixth Day of December, 2011

David J. Kappos
*Director of the United States Patent and Trademark Office*